(12) United States Patent
Lin

(10) Patent No.: US 7,296,269 B2
(45) Date of Patent: Nov. 13, 2007

(54) BALANCING LOADS AMONG COMPUTING NODES WHERE NO TASK DISTRIBUTOR SERVERS ALL NODES AND AT LEAST ONE NODE IS SERVED BY TWO OR MORE TASK DISTRIBUTORS

(75) Inventor: Sheng Ling Lin, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 863 days.

(21) Appl. No.: 10/420,415

(22) Filed: Apr. 22, 2003

(65) Prior Publication Data

US 2004/0216114 A1    Oct. 28, 2004

(51) Int. Cl.
G06F 9/46    (2006.01)
H04Q 7/20    (2006.01)

(52) U.S. Cl. ............... 718/105; 718/104; 455/453
(58) Field of Classification Search ............... 718/105, 718/104; 455/453
See application file for complete search history.

(56) References Cited

U.S. PATENT DOCUMENTS

| | | | | |
|---|---|---|---|---|
| 5,978,831 A | * | 11/1999 | Ahamed et al. | 718/105 |
| 6,393,458 B1 | * | 5/2002 | Gigliotti et al. | 709/203 |
| 6,986,139 B1 | * | 1/2006 | Kubo | 718/105 |
| 2003/0005068 A1 | * | 1/2003 | Nickel et al. | 709/208 |

* cited by examiner

Primary Examiner—Meng-Ai T. An
Assistant Examiner—Eric C Wai

(57) ABSTRACT

Load balancing is supported for a plurality of nodes having loads determined by a plurality of task distributors. A periodic, iterative process based on loads of real-time data causes the total load of each node to tend to converge towards equalization of loads among all of the nodes.

20 Claims, 3 Drawing Sheets

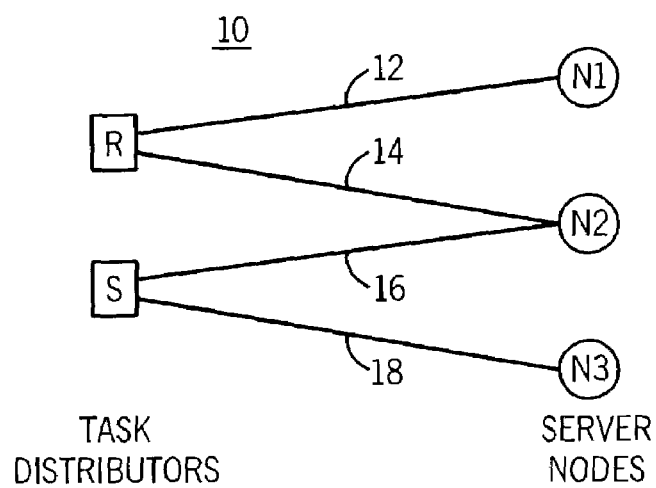
FIG. 1
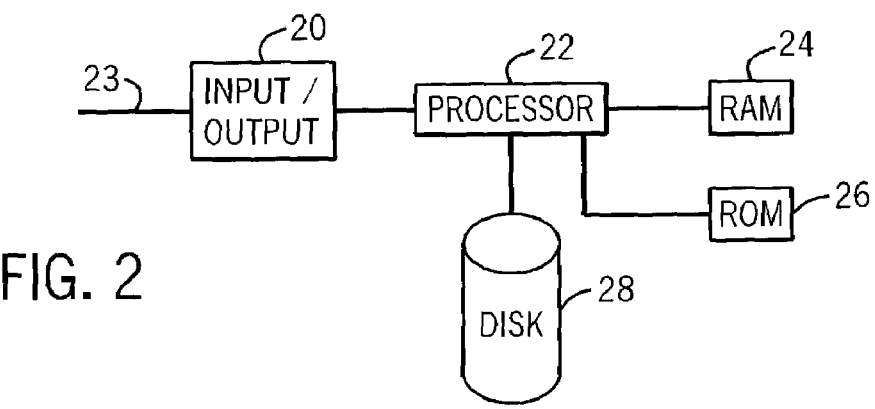
FIG. 2
FIG. 3
|   | N1 | N2 | N3 |   |
|---|---|---|---|---|
| R1 | 50 | 50 | 0 | T1 |
| S1 | 0 | 20 | 80 | T1 |
| L1 | 50 | 70 | 80 | T1 |
| R2 | 58 | 42 | 0 | T2 |
| S2 | 0 | 22 | 78 | T2 |
| L2 | 58 | 64 | 78 | T2 |

| PERIOD /SERVER NODES | N1 LOAD | N2 LOAD | N3 LOAD |
|---|---|---|---|
| L1 | 50 | 70 | 80 |
| L2 | 58 | 64 | 78 |
| L3 | 61 | 65 | 74 |
| L4 | 62 | 66 | 72 |
| L5 | 64 | 66 | 70 |
| L6 | 65 | 67 | 69 |
| L7 | 65 | 67 | 68 |
| L8 | 66 | 67 | 68 |
| L9 | 66 | 67 | 67 |
| L10 | 66 | 67 | 67 |

FIG. 4

BALANCING LOADS AMONG COMPUTING NODES WHERE NO TASK DISTRIBUTOR SERVERS ALL NODES AND AT LEAST ONE NODE IS SERVED BY TWO OR MORE TASK DISTRIBUTORS

BACKGROUND

This invention relates to a computing system in which loads can be distributed among different processors/nodes and more specifically relates to maintaining a balance of loads of the nodes, especially where those nodes may have different speeds and mix of applications.

Computing systems employing a plurality of processors/nodes include telecommunications systems and general computing systems where the demands of the applications require processing at multiple nodes. In such systems a software program may be run at multiple nodes to increase its capacity and speed of execution as well as providing reliability associated with redundancy. When a software program or task is distributed to more than one node, managing the load of each node supporting distributed tasks becomes a more complex consideration as compared with the use only one node to completely support a software program or task. Load management is further complicated since the load at a node supporting distributed processing may vary substantially over time as the demands associated with the supported processes increase and decrease. If an existing node becomes unavailable or if a new node is added to the system, the decrease or increase in total processing capacity of the system changes and must be accounted for by a change in the distribution of loads.

One factor influencing the management of loads is the difference in processing speed at each node. For example, a first node may process a task three times faster than a second node. Some currently utilized load management methods assigned a weighting factor corresponding to the speed of execution to each node to accommodate load variations that take into account different processor speeds. In this example to achieve an equal load (measured as the percent of time required to complete the tasks) on the first and second nodes, the first node will be assigned three times the amount of work to process as the second node. The use of such weighting factors permits the load management to accommodate different processing speeds at the nodes. However, such load management techniques are not flexible since each specific node must have a weighting factor assigned. The substitution of a node that has a substantially decreased or increased speed of execution for the node that it replaces will result in load management problems unless the corresponding weighting factor is adjusted. Such adjustments are normally manually made and result in administration work with its associated possibility of human error especially if node substitutions are often made.

Another example in a telecommunication system is mixing different small applications in a powerful processor. This is a cost saving option for a small office with only small capacity needs. The system designer needs redundancies to achieve a higher reliability, i.e., running applications on several independent nodes. However, the system cost will pressure the number of nodes to be minimized. The solution is mixing several applications in one node. If a node cannot take all applications because of some constraints, the mixing of different applications will create a heterogeneous configuration. The need to intelligently balance loads among assigned nodes become a challenge. Each assigned node may have different CPU speeds and different other applications. Therefore, there exists a need for improved load management that will provide increased flexibility in accounting for nodes with different speeds of execution and changes in processing loads.

SUMMARY OF THE INVENTION

It is an object of the present invention to provide load management with improved capabilities to address the above difficulties.

In accordance with an embodiment of the present invention, each application, or a fixed subset of an application, may consist of a task distributor and several server nodes. A method is provided for balancing loads in which load data is collected for each server node. The load data is preferably derived from real-time processing tasks by the nodes for a predetermined time interval. Each distributor can work independently without knowing the existence of other distributors. The task distributors distribute tasks (loads) to the server nodes. A cost for supporting the load of each task distributor at each node is calculated based on comparison of the total load at the node and the number of tasks, associated with each task distributor for the node. These costs are calculated and utilized to calculate a new load to be placed on each node by each respective task distributor during a next predetermined time interval.

BRIEF DESCRIPTION OF THE DRAWINGS

FIG. 1 is a block diagram of a computing system suited for incorporating an embodiment of the present invention.

FIG. 2 is a block diagram of an exemplary processing node.

FIG. 3 is a table illustrating processing loads associated with the nodes shown in FIG. 1 for a first time interval T1 and a second time interval T2.

FIG. 4 is a table illustrating processing loads associated with the nodes shown in FIG. 1 for a series of time intervals.

DETAILED DESCRIPTION

Figure 5:
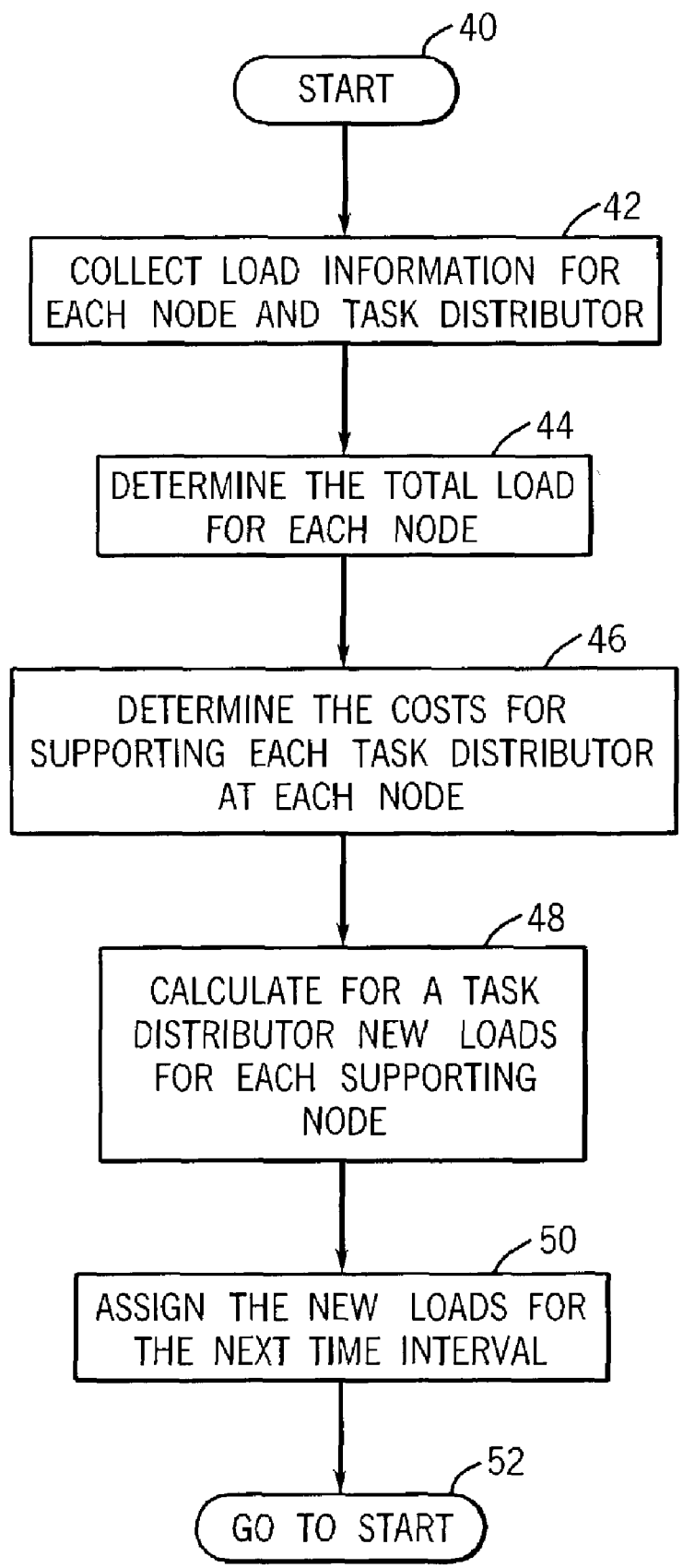
FIG. 5 is a flow diagram of an exemplary method in accordance with the present invention.

A general overview of characteristics and advantages of the present invention will help to provide a perspective in understanding the detailed description of an embodiment. Load balancing methods are, explicitly or implicitly, based on cost. As used herein "cost" is used in its broadest meaning to include effort, value, and sacrifice required to achieve a result. In accordance with the present invention, cost information is periodically calculated from feedback associated with the processing of real data. The interpretation and usage of this cost information in accordance with the present invention allows the coexistence of multiple applications, a mixture of servers of different speeds, and multiple task distributors.

Upon receiving the load status of a node, a task distributor calculates the average cost by dividing the total load of the node by the number of previously assigned tasks by the subject task distributor. This calculation is repeated for every node that is supporting the same application. If different nodes have different processor speeds, the cost will reflect the speed difference automatically. If there are multiple applications running on the same node, the cost calculated for each application on the node represents the current foothold of an application on that node. In accordance with the present invention the task distributors distribute future tasks proportional to the inverse of the unit-task cost. The costs are recalculated periodically based on the node load. The frequency of cost calculations should be relatively long compared with the duration to complete an average task. For example, for tasks that are normally completed in substantially less than one second, a recalculation frequency of 10 seconds could be used.

FIG. 1 illustrates an exemplary computing system 10 that includes task distributors R and S, and server nodes N1, N2, N3. Each of the server nodes represents an independent computing facility. Each task distributor is a logical element responsible for assigning a computing load consisting of one or more software applications or computing tasks. Task distributor R is connected by communication channels 12 and 14 to nodes N1 and N2, respectively, and distributes its tasks to nodes N1 and N2. Task distributor S is connected that communication channels 16 and 18 to nodes N2 and N3, respectively, and distributes its tasks to nodes N2 and N3. Thus, it will be apparent that node N2 is common to both distributors R and S, i.e. node N2 supports tasks assigned by both distributors R and S. In this exemplary embodiment system 10 comprises a telecommunication system in which calls and call processing tasks are assigned by the task distributors to the associated nodes for execution.

Since the task distributors are logical elements, they can be embodied in various hardware elements. For example, the task distributors could be implemented in one of the server nodes or could be implemented in any convenient hardware element that has access to the load to be distributed and to the nodes that will be executing the load.

FIG. 2 illustrates a block diagram of an exemplary server node. An input/output interface 20 supports digital communications between processor 22 and a communication channel 23. The processor 22 is further supported by random access memory (RAM) 24, read-only memory (ROM) 26, and nonvolatile storage element such as a disk drive 28. The processor 22 operates under program control instructions stored in memory and is capable of performing a variety of computing tasks. In the illustrative embodiment, the computing tasks may consist of various telecommunication call processing functions. In this environment the number of calls being handled and/or other processes may vary substantially giving rise to a corresponding variance in call processing loads.

FIG. 3 is a table showing loads associated with the task distributors and nodes as shown in FIG. 1 for a first time interval T1 and a second time interval T2. Each cell in the table represents a percentage load associated with one of the nodes N1, N2, N3. The rows R1, S1 and R2, S2 show tasks controlled by the R and S task distributors for time intervals T1 and T2, respectively. The rows L1, L2 represents the total loads placed on the respective nodes during time intervals T1 and T2, respectively. In accordance with the illustrative embodiment of the present invention, each load associated with a node is collected during each time interval, e.g. 10 seconds, and is used to calculate the total load on each node. Based on this information for a preceding time interval, new loads for each node associated with each task distributor are calculated.

As shown in FIG. 3, the loads associated with time interval T1 provides the basis for calculating loads to be placed on the nodes in time interval T2. In time interval T1, the R task distributor (R1) has distributed loads as follows: N1=50%, N2=50%, N3=0%. In the time interval T1, the S task distributor (S 1) has distributed loads as follows: N1=0%, N2=20%, N3=80%. As will be appreciated from FIG. 1, only node N2 supports a load from both the R and S task distributors. For purposes of this example it is assumed that each task causes a 1% load on the respective node so that the values in the table directly represent the loads as a percentage. This assumption does not lose any generality in considering embodiments of the present invention. Those skilled in the art will appreciate that the respective values in the table could represent the number of tasks assigned during each time interval as opposed to a load percentage. The total loads presented during time interval T1 are: N1=50%, N2=70%, N3=80%.

During a period transition, a task distributor has received load distributions $\rho_1$, $\rho_2$, and $\rho_3$ of the previous period corresponding to the server nodes N1, N2, N3. This distributor knows the number of corresponding tasks assigned to the server nodes in the previous period, i.e., $\eta_1$, $\eta_2$, and $\eta_3$. The percentage of tasks for the next period assigned to j-th node is:

$$\theta_j = \frac{\left(\frac{\eta_j}{\rho_j}\right)}{\sum_{i=1}^{3} \frac{\eta_i}{\rho_i}} \quad \text{EQ 1}$$

This formula can be extended to an arbitrary number of server nodes by changing the summation to the appropriate number of server nodes.

The R distributor knows the tasks distributed to three nodes are (50, 50, 0), representing N1=50%, N2=50%, N3=0%, and server nodes occupancy (total load from distributors) are (50, 70, 80). The S distributor knows the tasks distributed to three nodes are (0, 20, 80) and server node occupancy are (50, 70, 80). Both distributors receive the same node occupancy data from all server nodes. Each distributor may sense the relative slowness of server N2 but will not know why, i.e. the load placed on N2 by the other distributor(s) will not be known. Each distributor independently calculates the new distributions based on EQ1. Assuming the total number of tasks stay the same for the next period, the R distributor distributes the load (52, 48, 0) and the S distributor distributes the load (0, 22, 78).

The new total loads (L2) on the nodes during time interval T2 is the sum of the respective loads placed on the nodes by task distributors R and S during interval T2. Thus, the new loads on the nodes are: N1=58%, N2=64%, N3=78%. Comparing the new total loads with the previous total loads it will be appreciated that the loads at the respective nodes have moved towards equalizing the total loads among nodes. For example, the load at node N1 went from 50% to 58%, node N2 went from 70% to 64%, and node N3 went from 80% to 78%. Since the total cumulative loads during time intervals T1 and T2 remained a constant at 200%, a totally equalized load distribution among three nodes would be 66.6%. In the illustrative example the loads at L2 for nodes that were less than 66% in the previous time interval increased in value, and for nodes that were more than 66% in the previous time interval, the values decreased. Thus, the illustrative example demonstrates that the load balancing in accordance with the present invention causes load changes at the nodes tending to move the load at each node towards load equalization.

The table of FIG. 4 shows the continuation of the method for ten periods assuming the traffic volume is fixed, i.e. the total load to be distributed is fixed. It will be seen that after nine iterations all three of the nodes have achieved a steady state load with N1=66%, N2=67%, N3=67. This further demonstrates the ability of the illustrative method to converge the loads of the nodes to an equalized value.

In FIG. 5 the exemplary method for load balancing among a plurality of nodes is executed as part of the associated computing system. The method begins at Start 40. In step 42 load information is collected for each node and task distributor during a time interval. In step 44 the total load for each node is determined. The costs for supporting each task distributor at each node are determined from the load information at step 46. In step 48 new loads are calculated for each task distributor and supporting nodes. In step 50 the new loads are assigned to be used during the next time interval. The method continues with the periodic recalculation of loads at "go to start" step 52 that returns the process to Start 40.

The above-illustrated embodiment is given to show that the method can still bring the load back to an equalized load distribution. In a continuous operation, the load should not be off-balanced as much as initially shown in the example. This algorithm is stable around the optimal distributions.

In case of needing a faster convergence toward the optimal distributions, one can artificially raise the sensed CPU load of the server node that is way above the average. In the above-mention example, if we map 80% (way above the average of 67%) of N1 node to 85%, the convergence can be faster. Such a raise is not necessary if all nodes have similar CPU loads. The method itself can automatically assign a sensed load farther from the equalized load than is the actual measured cost/load in order to achieve quicker convergence. For example, if the measured total load at a node is farther than X%, e.g. 8%, from the equalized load, then the load will be mapped to be twice X% from the equalized load to speed convergence.

The previous paragraph describes the raise of load because of substantial load differences. The same concept can be used to provide some protection to nodes that are approaching overload by mapping lower the loads of other nodes that are not near overload to speed changes in reallocating some load from the near overload node(s). However, this technique needs to take the overall load into consideration. For example, if all nodes are approaching overload threshold, any such mappings will be fruitless.

Various modifications and changes can be made to the exemplary embodiment. For example, a task distributor may distribute its load among more than two support nodes. A single support node may support loads from more than two task distributors. Each task distributor may represent loads associated with one or a plurality of programs or functions. The task distributors may be implemented in a single network element or distributed among a plurality of elements, including a node that supports part of the load of the task distributor. Calculations may be based on loads measured as a percentage of processor usage or as the number of tasks assigned to a processor/node.

Although the embodiment of the present invention has been described above and shown in the drawings, the scope of the invention is defined by the claims that follow.

I claim:

1. A method for balancing loads in a computing system comprising the steps of:
    collecting load data for each of a plurality of nodes, the load data derived from the real-time processing of tasks by the nodes for a predetermined time interval;
    using a plurality of task distributors to distribute tasks to the nodes where each distributed task represents part of the load for the node, each task distributor serving two or more nodes, no task distributor serving all of the nodes, at least one node being served by two or more task distributors;
    determining a total load for each node comprising the sum of each load placed on the node by each task distributor;
    calculating a cost for supporting the load of each task distributor at each node based on a comparison of said total load of the node and the load associated with each task distributor for the node;
    utilizing said costs to calculate new loads to be placed on each node by the respective task distributors during a next predetermined time interval, where the new loads for the next predetermined time interval are based on the respective prior loads, the calculation of new loads causing a new total load at each node to change towards equalization of total loads across all nodes;
    placing said new loads on each node by the respective task distributors during the next predetermined time interval.

2. The method according to claim 1 wherein the step of calculating a cost comprises calculating a unit cost by dividing the total load of the node by a portion of the total load at the node associated with each task distributor.

3. The method according to claim 2 wherein the step of utilizing comprises summing all of the unit costs associated with a node to define a total unit cost for each node.

4. The method according to claim 3 wherein the new loads are calculated for each node based on the ratio of unit cost associated with each task distributor to the total unit cost.

5. The steps of claim 1 are implemented in the computing system that comprises a telecommunication system.

6. A method for balancing loads for nodes in a computing system comprising the steps of:
    determining a total load for each of said nodes comprising the sum of each load placed on the node by a task distributor where more than one task distributor can place a load on one of the nodes, said determination being made during a predetermined time interval, each task distributor serving two or more nodes, no task distributor serving all of the nodes at least one node being served by two or more task distributors;
    calculating a cost for supporting the load of each task distributor at each node during the predetermined time interval;
    calculating a new load for each node by each task distributor to be utilized during a next predetermined time interval, where each new load for the next predetermined time interval is based on the respective prior load, the new load calculation based on said total load for each node and said cost for supporting the load of each task distributor such that the new load at each node causes the total load at each node to change towards equalization of total loads across all nodes;
    placing said new loads on each node by the respective task distributors during a next predetermined time interval.

7. The method according to claim 6 wherein the step of calculating a cost comprises calculating a unit cost by dividing the total load of the node by a portion of the total load at the node associated with each task distributor.

8. The method according to claim 7 wherein the step of calculating a new load comprises summing all of the unit costs associated with a node to define a total unit cost for each node.

9. The method according to claim 8 wherein the new loads are calculated for each node based on the ratio of unit cost associated with each task distributor to the total unit cost.

10. The steps of claim 6 are implemented in the computing system that comprises a telecommunication system.

11. The method according to claim 6 further comprising the step of changing the cost calculated for a node to a value farther away from an equalization value that the calculated cost value to achieve faster convergence toward said equalization value, where the speed of the convergence is based on the difference between the equalization value and the value of the calculated cost.

12. The method according to claim 1 further comprising the step of changing the cost calculated for a node to a value farther away from an equalization value than the calculated cost value to achieve faster convergence toward said equalization value, where the speed of the convergence is based on the difference between the equalization value and the value of the calculated cost.

13. The method according to claim 1 wherein said nodes comprise at least a first and second node where the second node has a processing speed substantially different from the processing speed of the first node, the calculation of new loads automatically compensating for the processing speed difference between the first and second nodes.

14. The method according to claim 6 wherein said nodes comprise at least a first and second node where the second node has a processing speed substantially different from the processing speed of the first node, the calculation of new loads automatically compensating for the processing speed difference between the first and second nodes.

15. The method according to claim 1 wherein the step of placing new loads comprises changing the total load of each of the nodes in accord with the calculation of the new loads during each predetermined time interval.

16. The method according to claim 1 wherein a plurality of tasks are to be assigned by the task distributors during each predetermined time interval, the calculation of the new loads based on said plurality of tasks to be assigned.

17. The method according to claim 16 wherein the placing step assigns all of the plurality of tasks during the next predetermined time interval.

18. The method according to claim 6 wherein the step of placing new loads comprises changing the total load of each of the nodes in accord with the calculating of the new loads during each predetermined time interval.

19. The method according to claim 6 wherein a plurality of tasks are to be assigned by the task distributors during each predetermined time interval, the calculating of the new loads based on said plurality of tasks to be assigned.

20. The method according to claim 19 wherein the placing step assigns all of the plurality of tasks during the next predetermined time interval.

\* \* \* \* \*